United States Patent
Tico et al.

(10) Patent No.: US 7,965,317 B2
(45) Date of Patent: Jun. 21, 2011

(54) SYSTEM AND METHOD FOR IMPLEMENTATION MOTION-DRIVEN MULTI-SHOT IMAGE STABILIZATION

(75) Inventors: Marius Tico, Mountain View, CA (US); Markku Vehvilainen, Tampere (FI)

(73) Assignee: Nokia Corporation, Espoo (FI)

(*) Notice: Subject to any disclaimer, the term of this patent is extended or adjusted under 35 U.S.C. 154(b) by 454 days.

(21) Appl. No.: 12/066,821

(22) PCT Filed: Sep. 14, 2005

(86) PCT No.: PCT/IB2005/002725
§ 371 (c)(1),
(2), (4) Date: Sep. 5, 2008

(87) PCT Pub. No.: WO2007/031808
PCT Pub. Date: May 22, 2007

(65) Prior Publication Data
US 2009/0009612 A1  Jan. 8, 2009

(51) Int. Cl.
H04N 5/228 (2006.01)
H04N 5/262 (2006.01)
H04N 5/222 (2006.01)

(52) U.S. Cl. ............ 348/208.4; 348/208.12; 348/222.1; 348/239; 348/333.12

(58) Field of Classification Search ............ 348/208.99, 348/208.1, 208.2, 208.4, 208.5, 208.6, 208.7, 348/208.12, 208.16, 208.13, 220.1, 222.1, 348/223.1, 362, 363, 361, 364
See application file for complete search history.

(56) References Cited

U.S. PATENT DOCUMENTS

| | | | |
|---|---|---|---|
| 4,448,510 A * | 5/1984 | Murakoshi | 396/53 |
| 5,585,848 A | 12/1996 | Hieda et al. | 348/297 |
| 6,778,210 B1 | 8/2004 | Sugahara et al. | 348/208.4 |
| 7,315,324 B2 * | 1/2008 | Cleveland et al. | 348/208.4 |
| 7,714,890 B2 * | 5/2010 | Okubo et al. | 348/208.16 |
| 2004/0160525 A1* | 8/2004 | Kingetsu et al. | 348/364 |
| 2004/0238718 A1 | 12/2004 | Washisu | 250/201.2 |
| 2005/0248660 A1* | 11/2005 | Stavely et al. | 348/208.16 |
| 2007/0296833 A1* | 12/2007 | Corcoran et al. | 348/231.99 |

FOREIGN PATENT DOCUMENTS

| | | |
|---|---|---|
| EP | 1 304 872 A1 | 4/2003 |
| WO | WO 00/52926 | 9/2000 |
| WO | WO 01/10110 A2 | 2/2001 |

* cited by examiner

*Primary Examiner* — Lin Ye
*Assistant Examiner* — Marly Camargo
(74) *Attorney, Agent, or Firm* — Harrington & Smith (57) ABSTRACT

An improved system and method for capturing an image using a camera or a camera module. In the present invention, the number of image shots taken, as well as the integration time of each image shot, are controlled based upon knowledge about the existence or absence of camera motion. Whenever a motion is detected above a predetermined motion threshold, the integration phase of the current image shot ends, and the integration of the next image shot begins. The present invention therefore adapts to the actual camera motion during exposure. If there is no camera motion, a single, long exposed image shot is captured. If there is camera motion, the total exposure time is divided between multiple shots in accordance with the degree of camera motion.

27 Claims, 5 Drawing Sheets

SYSTEM AND METHOD FOR IMPLEMENTATION MOTION-DRIVEN MULTI-SHOT IMAGE STABILIZATION

FIELD OF THE INVENTION

The present invention relates generally to the field of cameras and camera modules. More particularly, the present invention relates to systems for improving image stabilization in cameras and camera modules.

BACKGROUND OF THE INVENTION

Since the beginning of photography, image stabilization has been a consistent issue. The problem of ensuring that a photograph is not blurred due to camera movement has remained an issue even as camera technology has progressed to the present day. In digital cameras, the problem of image stabilization stems from fact that any known image sensor needs to have the image projected on it during a period of time referred to herein as integration time. Any motion of the camera during this time causes a shift of the image projected on the sensor, resulting in a degradation of the final image. This degradation is referred to herein as motion blur.

One of the principal difficulties in restoring motion blurred images involves the fact that the motion blur is different in each degraded image. The level of motion blur depends upon the camera motion that takes place during the exposure time.

The ongoing development and miniaturization of consumer devices that have image acquisition capabilities increases the need for robust and efficient image stabilization solutions. The need is driven by two main factors. The first factor is the inherent difficulty in avoiding unwanted motion during the integration time when using a small hand-held device, such a camera telephone. The second factor is the need for longer integration times due to the small pixel area that results from the miniaturization of the image sensors in conjunction with the increase in image resolution. The smaller the pixel area, the fewer photons/second can be captured by the pixel. Therefore, a longer integration time is needed for satisfactory results.

Currently, there are two categories of conventional solutions for addressing image stabilization. These solutions are referred to as single-shot and multi-shot solutions. Single-shot solutions are solutions based upon capturing a single image shot during a long exposure time. This is the classical system for image capturing, where the acquired image is typically corrupted by motion blur, caused by the motion that took place during the exposure time. In order to restore the image, it is necessary to have very accurate knowledge about the motion that took place during the exposure time. Consequently, this approach may require expensive motion sensors (i.e., in the form of gyroscopes), which are also large in size and therefore difficult to include in small devices. In addition, if the exposure time is large, then the position information derived from the motion sensor output exhibits a bias drift error with respect to the true value. The bias drift error accumulates over time such that the outcome of the process can be significantly corrupted over time.

Several entities have implemented a particular type of single-shot solution in high-end cameras. This approach involves compensating for the motion by moving the optics or the sensor in order to keep the image projected onto the same position of the sensor during the exposure time. However, this solution also suffers from system drift error and is therefore not practical for long exposure times.

In contrast, multi-shot solutions are based upon dividing a long exposure time into several shorter intervals by capturing several image shots of the same scene. The exposure time for each shot is small in order to reduce the motion blur degradation of the individual shots. After capturing all these shots, the final image is calculated in two steps. The first step involves registering all image shots with respect to the first image shot. This is referred to as the registration step. The second step, referred to as pixel fusion, involves calculating the value of each pixel in the final image based upon its values in each of the individual shots. One simple method of pixel fusion involves calculating the final value of each pixel as the average of its values in the individual shots.

Although resolving some of the issues discussed above, multi-shot solutions require a large amount of computational resources in order to capture several high resolution frames during a short interval of time. In addition, these methods also require a large amount memory in order to store the captured image shots before the pixel fusion step. This can be especially expensive to implement in smaller devices where memory resources may be quite limited.

SUMMARY OF THE INVENTION

The present invention provides for a hybrid approach between multi-shot and single-shot solutions for image capture. In the present invention, the number of image shots taken, as well as the integration time of each image shot, are controlled based upon knowledge about the existence or absence of any camera motion. Whenever a motion is detected, the integration phase of the current image shot ends, and the integration of the next image shot begins. The present invention therefore adapts to the actual camera motion during exposure. If there is no camera motion, a single, long exposed image shot is captured. If there is camera motion, the total exposure time is divided between multiple shots in accordance with the degree of camera motion.

The present invention includes a method of capturing an image using a camera over an image capture period. The method comprises starting an integration phase for capturing a frame. If a motion above a predetermined motion threshold is detected in the camera, or if the end of a predetermined integration period is reached, the integration phase is ended, and the captured frame is saved. If the time of the integration phase for the captured frame does not reach the time of the image capture period, frames continue to be captured and saved until a total time of the integration phases reaches the time of the image capture period, after which a final picture is created by combining each of the captured frames.

The present invention also includes a computer program product for capturing an image using a camera over an image capture period. The computer program product comprises computer code for starting an integration phase for capturing a frame; computer code for, if a motion above a predetermined motion threshold is detected in the camera, or if the end of a predetermined integration period is reached, ending the integration phase and saving the captured frame; computer code for, if the time of the integration phase for the captured frame does not reach the time of the image capture period, continuing to capture and save frames until a total time of the integration phases reaches the time of the image capture period; and computer code for creating a final picture by combining each of the captured frames.

The present invention still further includes an electronic device comprising a processor and a memory unit operatively connected to the processor. The memory unit includes computer code for starting an integration phase for capturing a frame; computer code for, if a motion above a predetermined motion threshold is detected in the camera, or if the end of a predetermined integration period is reached, ending the integration phase and saving the captured frame; computer code for, if the time of the integration phase for the captured frame does not reach the time of the image capture period, continuing to capture and save frames until a total time of the integration phases reaches the time of the image capture period; and computer code for creating a final picture by combining each of the captured frames.

The present invention also comprises a camera module. The camera module comprises a lens positioned for focusing an image; a sensor unit receiving the image focused by the lens; a processor operatively connected to the sensor unit; and a memory unit operatively connected to the processor. The memory unit includes computer code for starting an integration phase for capturing a frame, computer code for, if a motion above a predetermined motion threshold is detected in the camera module, or if the end of a predetermined integration period is reached, ending the integration phase and saving the captured frame, computer code for, if the time of the integration phase for the captured frame does not reach the time of the image capture period, continuing to capture and save frames until a total time of the integration phases reaches the time of the image capture period, and computer code for creating a final picture by combining each of the captured frames.

The present invention further includes computer program for capturing an image using a camera module over an image capture period. The computer program comprises means for starting an integration phase for capturing a frame; means for, if a motion above a predetermined motion threshold is detected in the camera, or if the end of a predetermined integration period is reached, ending the integration phase and saving the captured frame; means for, if the time of the integration phase for the captured frame does not reach the time of the image capture period, continuing to capture and save frames until a total time of the integration phases reaches the time of the image capture period; and computer code for creating a final picture by combining each of the captured frames.

The present invention provides for a number of substantial advantages not available in conventional systems. With the present invention, there is no need to use expensive motion sensors, as the motion must be only detected and not measured. Simple motion sensors can provide very good results for this purpose. For example, accelerometers are much smaller and less expensive than gyroscopes and therefore could be particularly useful for the purpose of the invention. It also may be possible to use two or more accelerometers distributed along the device's borders in order to sense rotational motion in addition to linear translation.

With the present invention, the number of image shots captured during exposure is reduced to a minimum, reducing the computational cost of processing many image shots and the memory requirements compared to the classical multi-shot approach. In addition, the present invention allows for the adjustment of the level of the motion detection threshold in accordance with the state of the system. For example, the threshold could be adjusted in accordance to the zoom ratio used when capturing the image. Therefore, when using a large zoom ratio, a small threshold would be needed because even a small motion could cause a significant shift of the image projected onto the image sensor. On the other hand, when using a zoom×1, the same motion could result in a very small shift, which does not justify the interruption of the exposure time for the current frame.

The system and method of the present invention possesses all of the advantages of the multi-shot technique described above. In particular, the use of the present invention results in a small level of noise sensitivity, and the present invention does not require the system to apply inverse filtering to restore the image. At the same time, the present invention possesses the advantages of the single shot technique, namely the small memory requirements and low computational cost due to the small number of captured image shots.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
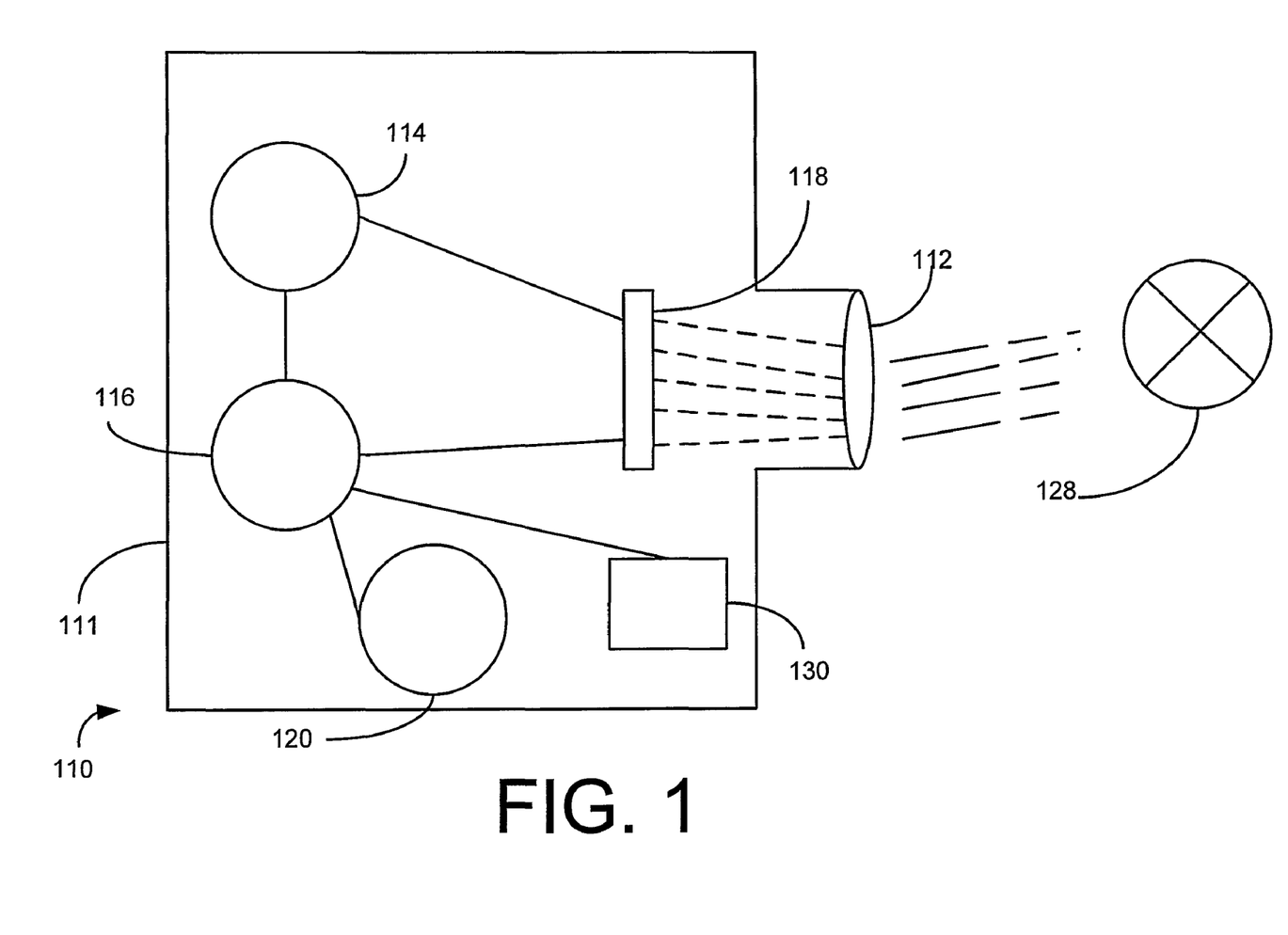
FIG. 1 is a sectional side view of a generic digital camera according to the principles of the present invention.

A generic camera module constructed according to the principles of the present invention is shown at 110 in FIG. 1. The camera module 110 can be a stand-alone device or can be incorporated into another electronic device, such as a portable telephone. The camera module 110 includes a housing 111 which contains at least one lens 112, a primary memory unit 114, a camera processor 116, and at least one image sensor 118. The primary memory unit 114 can be used to store digital images and computer software for performing various functions in the camera module 110, as well as to implement the present invention. A removable, secondary memory unit 120 in the form of a memory card can also be included in the digital camera to provide extra memory space. The image sensor 118 can be a charge coupled device (CCD), a complementary metal oxide semiconductor (CMOS), or another system. The camera module 110 also includes at least one motion sensor 130 operatively connected to the camera processor 116. When a picture of an object 128 is taken, the at least one lens 112 focuses the image onto the at least one image sensor 118 which records light electronically. The camera processor 116 then breaks this electronic information down into digital data which can be stored on the primary memory unit 114 and/or the secondary memory unit 120.

Figure 2:
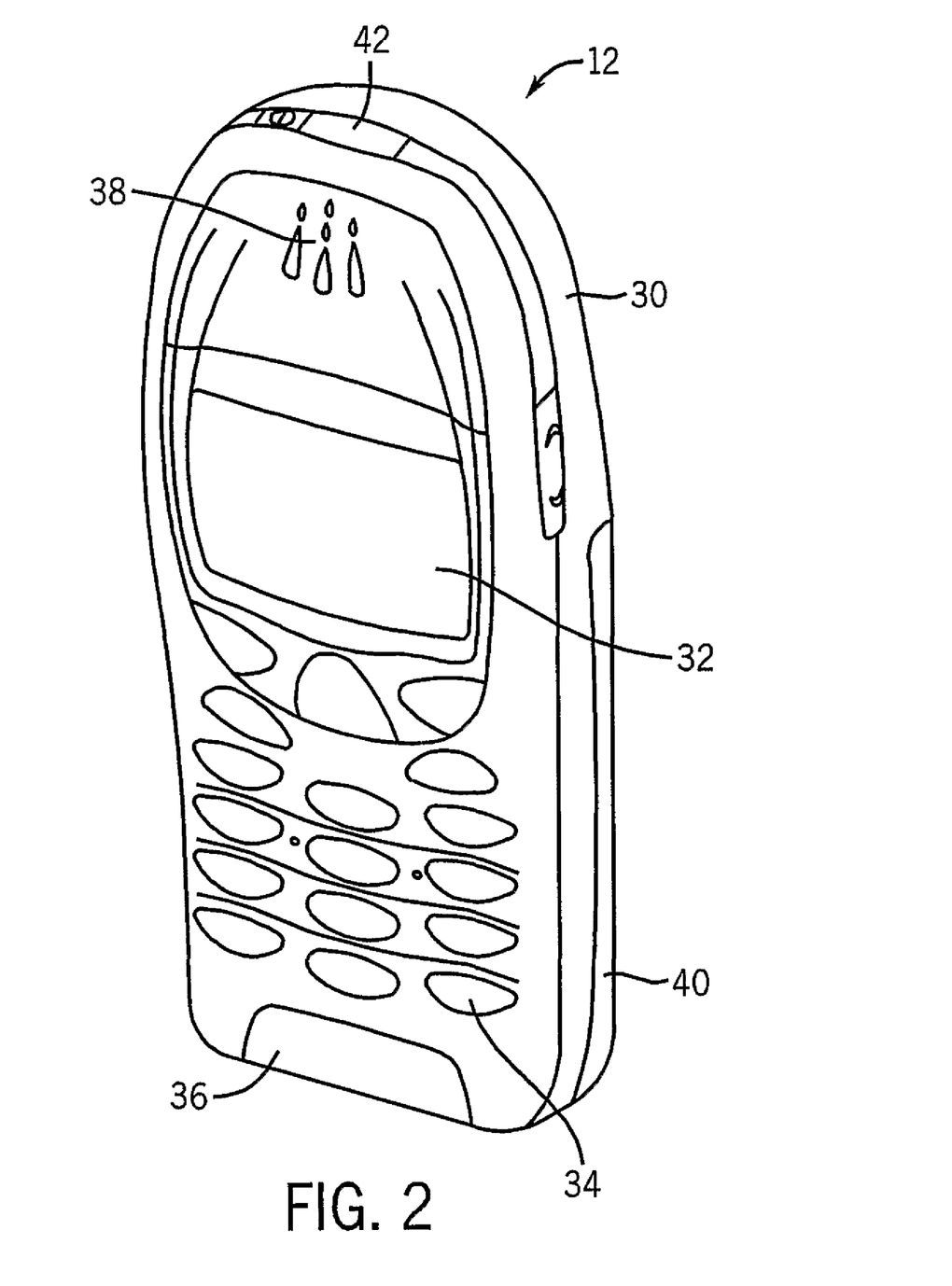
FIG. 2 is a perspective view of a mobile telephone that can be used in the implementation of the present invention.
Figure 3:
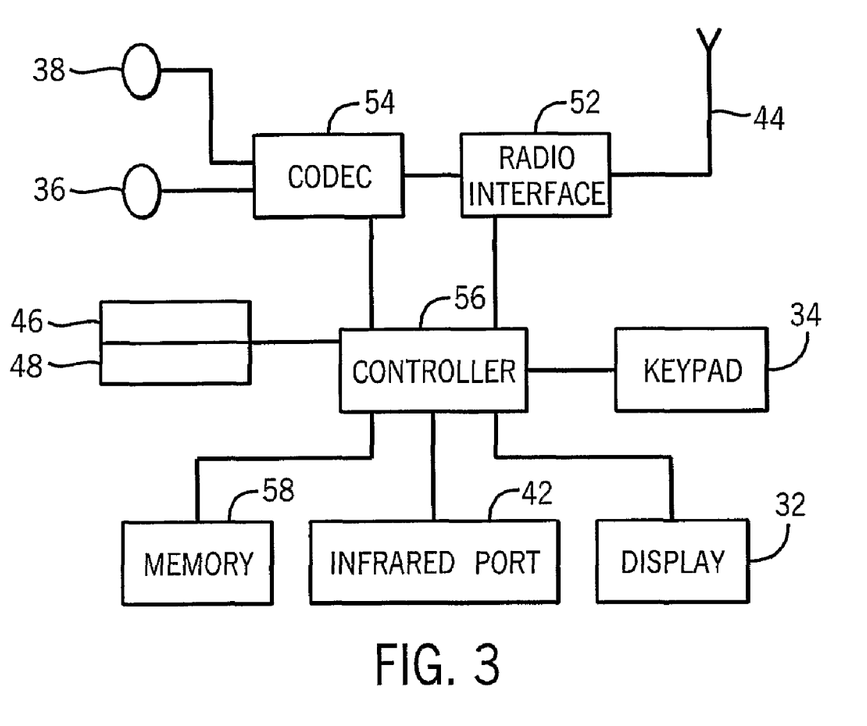
FIG. 3 is a schematic representation of the telephone circuitry of the mobile telephone of FIG. 2.

FIGS. 2 and 3 show one representative mobile telephone 12 upon which the present invention may be implemented. However, it is important to note that the present invention is not limited to any type of electronic device and could be incorporated into devices such as personal digital assistants, personal computers, and other devices. It should be understood that the present invention could be incorporated on a wide variety of mobile telephones 12. The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a universal integrated circuit card (UICC) according to one embodiment of the invention, a card reader 48, radio interface circuitry 52, codec circuitry 54, a controller 56 and a memory 58. It should be noted that the controller 56 can be the same unit or a different unit than the camera processor 116. The memory 58 may or may not be the same component as the primary memory unit 114 in various embodiments of the present invention. Individual circuits and elements are all of a type well known in the art, for example in the Nokia range of mobile telephones.

The present invention involves the controlling of the number of image shots that are taken by a camera or camera module. In particular, the present invention involves the adjustment of the integration time of each image shot based upon the existence or absence of any camera motion. Whenever a motion is detected, the integration phase of the current image shot ends, and the integration of the next image shot begins. The present invention therefore adapts to the actual camera motion during exposure. If there is no camera motion, a single, long exposed image shot is captured. If there is camera motion, the total exposure time is divided between multiple shots in accordance with the degree of camera motion. The present invention provides for a hybrid solution between the single shot approach and the multi-shot approach, wherein a multi-shot technique is driven by the presence or absence of camera motion detected with the assistance of one or more motion sensors.

The present invention involves maintaining the exposure phase of each individual image shot for as long of a period as there is no motion, or where the motion detected by the motion sensors is bellow a certain threshold value. As soon as a motion is sensed (or a motion above the threshold is detected), then the integration of the current shot ends, and a new integration phase begins for the next shot.

The present invention does not require accurate information about the precise magnitude of motion of the camera or camera module, meaning that no sophisticated motion sensors are required. Because the present invention only requires a mechanism for detecting the presence or absence of motion, and does not have to accurately measure the motion trajectory, small and inexpensive motion sensors such as accelerometers may be used with the present invention. Such presence or absence of motion can be easily determined by comparing the output value of the motion sensor or sensors with a given threshold, referred to herein as a motion detection threshold.

In addition to the above, the present invention permits the camera or camera module to adapt both the number of shots and the exposure time of each shot in accordance with the camera motion. If no motion is detected by the motion sensor or sensors, then the camera or camera module simply takes a single shot during the given exposure time. On the other hand, if the motion sensor or sensors detects motion of the camera or camera module, then the given exposure time is divided between multiple image shots. This adaptive approach ensures a minimum number of shots in accordance with the existing motion during exposure.

The implementation of one general embodiment of the present invention involves controlling the camera shutter by software or hardware methods such that the shutter closes whenever a motion is detected. There are a number of basic aspects that are taken into consideration in the implementation of various embodiments of the invention. For example, a minimum exposure time for a frame should be established. This is needed in order to avoid very short frames, if motion is detected immediately upon beginning the exposure. Additionally, a maximum total integration time (i.e., the sum of the individual integration times for each shot) also needs to be set. The maximum total integration time for each frame is needed in order to establish a reasonable limit for the integration time in case there is no motion and only one frame is captured. Lastly, a motion detection threshold should be set. The motion detection threshold represents the minimum value of the motion magnitude (e.g. acceleration), below the system will be treated as if there is no motion occurring that could affect the photograph. The motion detection threshold is used to differentiate "motion" and "no motion" situations from the point of view of the values generated by the motion sensor or sensors.

Figure 4A:
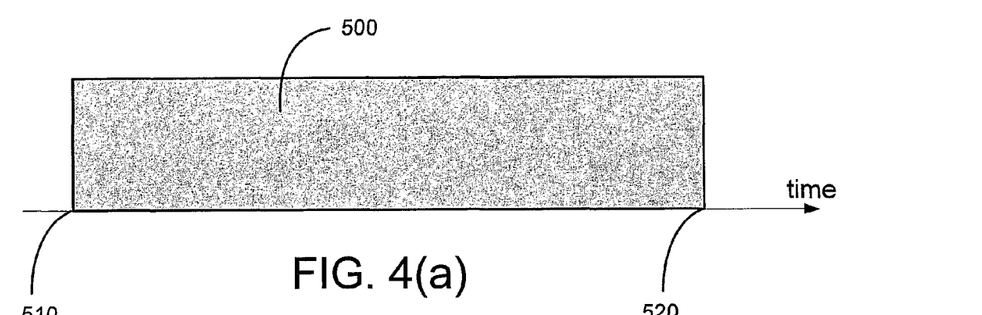
FIGS. 4(a)-4(c) are illustrations showing the differences between a classical single-shot approach for reducing image blur, conventional multi-shot techniques, and the motion-driven multi shot approach of the present invention.
Figure 4B:
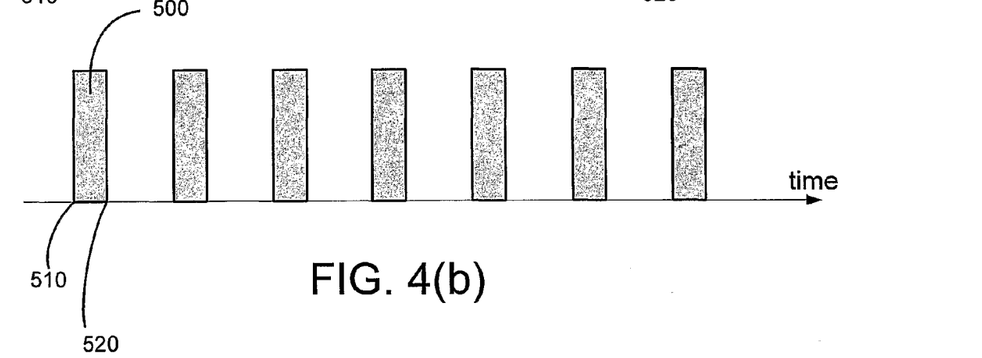
Figure 4C:
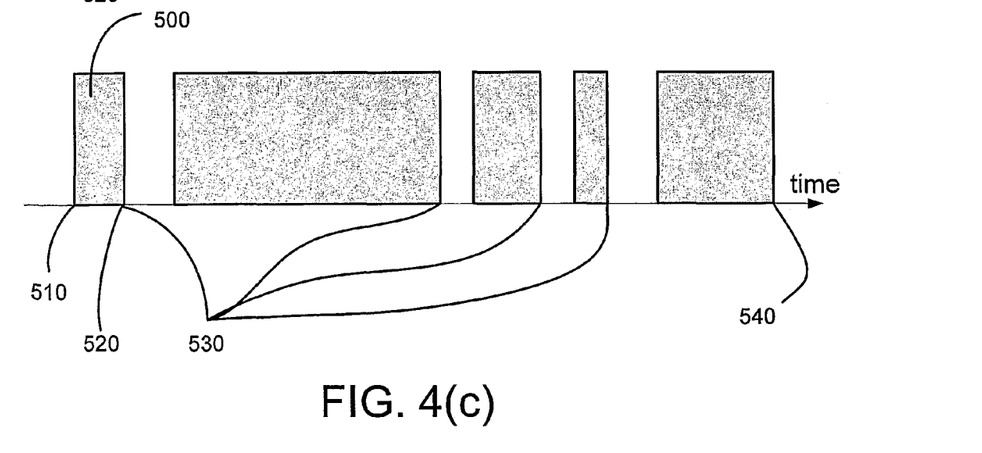

FIGS. 4(a)-4(c) depict the differences between conventional single shot approaches, conventional multi-shot approaches, and the approach of the present invention. FIG. 4(a) shows the single-shot approach, where a single integration phase 500 is used to capture an image shot during the time between an integration time start 510 and an integration time stop 520. FIG. 4(b) shows the multi-shot approach, where there are several integration phases 500 over the same time period, each with its own integration time start 510 and integration time stop 520. For each integration phase 500, the length of time between the integration time start 510 and the integration time stop 520 is substantially the same. In contrast, FIG. 4(c) shows the implementation of the present invention. In FIG. 4(c), like FIG. 4(b) involves multiple integration phases 500. However, the length of time for each integration phase 500 is not constant. Instead, the integration time stop 520 of each shot is determined by either the detection or any motion or a predefined level of motion, both of which are represented at step 530. This process continues until the end of the total integration time requested by the system 540, based upon light conditions and other factors.

Figure 5:
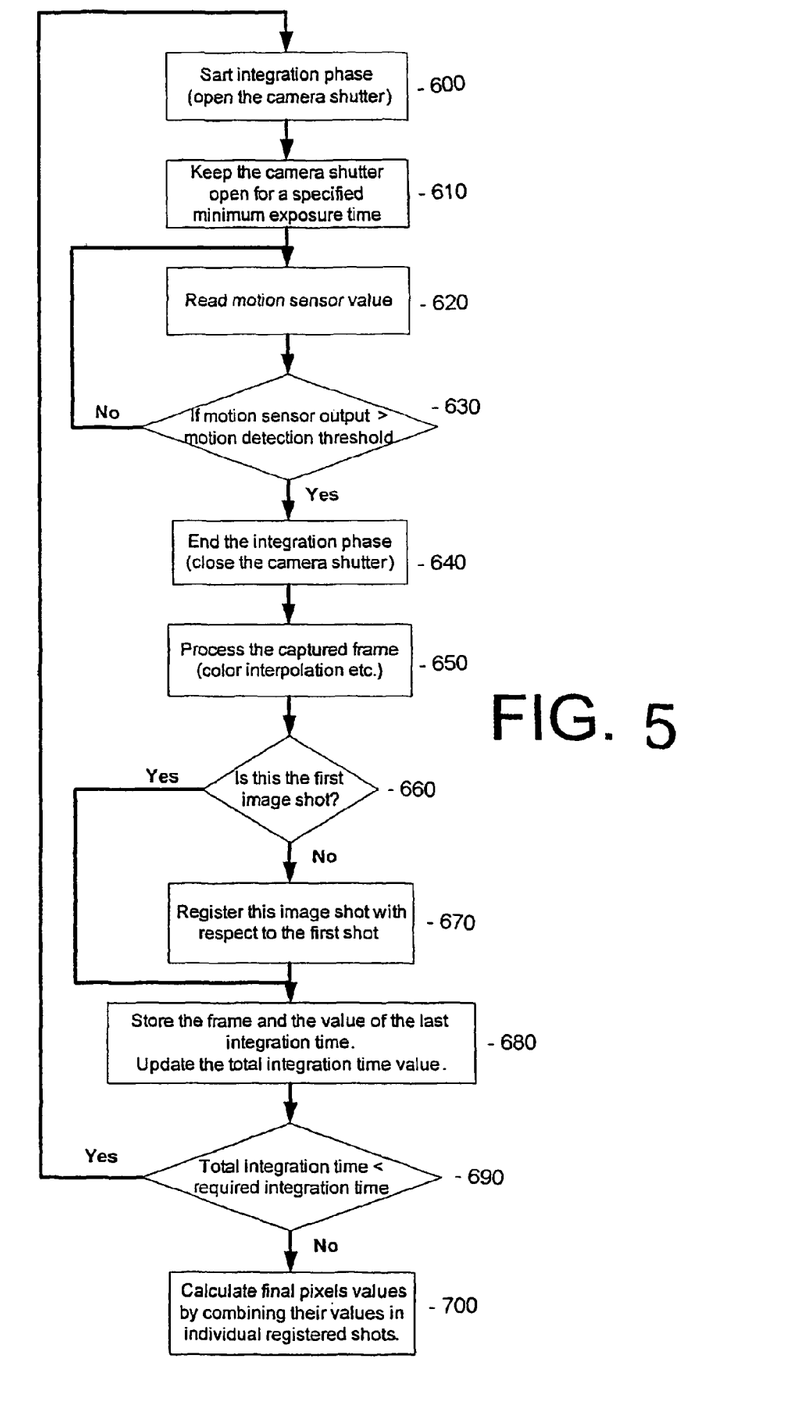
FIG. 5 is a flow chart showing the implementation of one embodiment of the present invention.

FIG. 5 is a flow chart showing the implementation of one embodiment of the present invention. At step 600 in FIG. 5, a first integration phase beings. This is typically accompanied by the opening of the camera shutter. At step 610, the camera shutter is kept open for a period of exposure time, continuing the integration phase. This period of time typically has a minimum threshold, and it may also have a maximum threshold. At step 620, the value of one or more motion sensors is read. It is then determined whether the motion sensor output exceeds a motion detection threshold at step 630. This motion threshold can be zero, or it can be a higher level to permit what is determined to be insignificant movement. If the motion threshold is not exceeded, then the motion sensor or sensors will be read again at a later time. It should be noted that this can occur on a continuous basis, or the next reading could occur after a predefined period of time.

If the motion sensor output exceeds the threshold, then the integration phase is terminated at step 640. At this point, the camera shutter closes. The shutter can also close if the maximum period of exposure time for each frame, also referred to as an integration period, is reached. In still another embodiment of the invention, the shutter could close if the total amount of time for taking the complete picture has expired. The closing of the camera shutter can also be accompanied by the generation of an artificial sound, giving the user guidance regarding the relative movement of the camera or camera module. At step 650, the captured frame is processed. This step involves functions such as color interpolation and others. At step 660, it is determined whether the captured frame was the first image shot. If the captured frame was the first image shot, then at step 680, the frame and the value of the integration time is recorded. If the captured frame was not the first image shot, then the image shot is registered with respect to the first image shot. This occurs at step 670, and is followed by step 680, with the value of the integration time being updated.

At step 690, it is determined whether the total integration time is less than the required integration time for a particular photograph, also referred to as an image capture period. If the total integration time is not less than the required integration time or the image capture period, then the final pixel values are calculated by combining their values in the individual registered shots. This is represented at step 700, and the final image has thus been processed. If, on the other hand, the total integration time is less than the required integration time or the image capture period, then the process returns to step 600, and a new integration phase begins.

The pixel fusion step 700 can be carried out in various ways. One way is to calculate the final pixel value as a weighted average of its values in all of the individual image shots. The most natural weights are exactly the integration time for each shot in a particular embodiment. Thus, by denoting the integration times of the N captured image shots as $T_1, T_2, \ldots, T_N$, the final value of the pixel located at (x,y) coordinates is given by $$I(x, y) = \frac{\sum_{n=1}^{N} T_n \cdot I_n(x, y)}{\sum_{n=1}^{N} T_n}$$

In this scenario, $I_n$, (x,y) denotes the value of the (x,y) pixel in the n-th image shot.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
   at the beginning of an image capture period starting a first integration phase for capturing a frame by opening a shutter of a camera;
   during the image capture period, if a motion above a predetermined motion threshold is detected in the camera, ending the first integration phase by closing the shutter and saving a first captured frame;
   if the duration of the first integration phase for the captured frame is less than the image capture period, opening the shutter and starting a second integration phase;
   if a motion above the predetermined motion threshold is detected in the camera, ending the second integration phase by closing the shutter and saving a second captured frame; and
   at the end of the image capture period, creating a final picture by combining at least the first and the second captured frames.

2. The method of claim 1, wherein motion in the camera is detected using at least one motion sensor.

3. The method of claim 2, wherein the at least one motion sensor comprises at least one accelerometer.

4. The method of claim 1, wherein the motion detection threshold is automatically adjusted in accordance with a zoom ratio used when capturing the image.

5. The method of claim 1, wherein the motion detection threshold is manually adjustable by the user.

6. The method of claim 1, wherein each integration phase has a minimum amount of exposure time.

7. The method of claim 1, wherein the beginning of each integration phase comprises the opening of the camera shutter, and wherein the end of each integration phase comprises the closing of the camera shutter.

8. The method of claim 1, wherein the creation of the final picture comprises, for each pixel calculating a final pixel value based upon the pixel values in each of the captured images for the same pixel.

9. The method of claim 1, further comprising processing each of the captured frames before saving the captured frames.

10. The method of claim 1, wherein the processing comprises color interpolation.

11. A set of computer-executable instructions stored in a non-transitory computer-readable storage medium, comprising computer executable instructions for controlling a processor to perform the method of claim 1.

12. A non-transitory computer-readable medium that stores a computer program, the execution of the computer program by at least one processor results in operations to capture for capturing an image using a camera over an image capture period, comprising operations of:
   at a beginning of an image capture period, starting a first integration phase for capturing a frame by opening a shutter of the camera;
   during the image capture period, if a motion above a predetermined motion threshold is detected in the camera, ending the first integration phase by closing the shutter and saving a first captured frame;
   if a duration of the first integration phase for the captured frame is less than the image capture period, opening the shutter and starting a second integration phase;
   if a motion above the predetermined motion threshold is detected in the camera, ending the second integration phase by closing the shutter and saving a second captured frame; and at the end of the image capture period, creating a final picture by combining at least the first and the second captured frames.

13. The non-transitory computer-readable medium of claim 12, wherein the motion detection threshold is automatically adjusted in accordance with a zoom ratio used when capturing the image.

14. The non-transitory computer-readable medium of claim 12, wherein the motion detection threshold is manually adjustable by the user.

15. The non-transitory computer-readable medium of claim 12, wherein each integration phase has a minimum amount of exposure time.

16. The non-transitory computer-readable medium of claim 12, wherein the beginning of each integration phase comprises the opening of the camera shutter, and wherein the end of each integration phase comprises the closing of the camera shutter.

17. The non-transitory computer-readable medium of claim 12, wherein the creation of the final picture comprises for each pixel, calculating a final pixel value based upon the pixel values in each of the captured images for the same pixel.

18. The non-transitory computer-readable medium of claim 12, further comprising an operations of processing each of the captured frames before saving.

19. The non-transitory computer-readable medium of claim 18, wherein the processing comprises color interpolation.

20. An apparatus, comprising:
a processor;
a camera module comprising a camera connected to the processor; and
a non-transitory memory unit connected to the processor and storing computer program instructions executable by the processor to, at a beginning of an image capture period, start a first integration phase for capturing a frame by opening a shutter of the camera;
during the image capture period, if a motion above a predetermined motion threshold is detected in the camera, to end the first integration phase by closing the shutter and saving a first captured frame;
if a duration of the first integration phase for the captured frame is less than the image capture period, to open the shutter and start a second integration phase;
if a motion above the predetermined motion threshold is detected in the camera, to end the second integration phase by closing the shutter and saving a second captured frame; and
at the end of the image capture period, to create a final picture by combining at least the first and the second captured frames.

21. The apparatus of claim 20, wherein the motion detection threshold is automatically adjusted in accordance with a zoom ratio used when a capturing the image.

22. The apparatus of claim 20, wherein the motion detection threshold is manually adjustable by the user.

23. The apparatus of claim 20, wherein the creation of the final picture comprises for each pixel, calculating a final pixel value based upon the pixel values in each of the captured images for the same pixel.

24. The apparatus of claim 20, wherein each integration phase has a minimum amount of exposure time.

25. The apparatus of claim 20, wherein the memory unit further comprises computer code for processing each of the captured frames before saving.

26. A camera module, comprising:
a lens positioned for focusing an image;
a sensor unit receiving the image focused by the lens;
a processor connected to the sensor unit; and
a memory unit connected to the processor, the memory unit including computer code the execution of the computer code by the processor performs operations comprising,
at a beginning of an image capture period, starting a first integration phase for capturing a frame by opening a shutter of the camera;
during the image capture period, if a motion above a predetermined motion threshold is detected in the camera, ending the first integration phase by closing the shutter and saving a first captured frame;
if a duration of the first integration phase for the captured frame is less than the image capture period, opening the shutter and starting a second integration phase;
if a motion above the predetermined motion threshold is detected in the camera, ending the second integration phase by closing the shutter and saving a second captured frame; and
at the end of the image capture period, creating a final picture by combining at least the first and the second captured frames.

27. A computer program embodied in a non-transitory computer-readable storage medium and comprising program code for capturing an image using a camera module over an image capture period, comprising:
means for starting a first integration phase at a beginning of an image capture period for capturing a frame by opening a shutter of the camera;
means for detecting during the image capture period an occurrence of motion above a predetermined motion threshold and for ending the first integration phase by closing the shutter and saving a first captured frame;
means responsive to a determination that a duration of the first integration phase for the captured frame is less than the image capture period for opening the shutter and starting a second integration phase;
said means for detecting further configured to detect if a motion above the predetermined motion threshold is detected for ending the second integration phase by closing the shutter and saving a second captured frame; and
means, responsive to an end of the image capture period, for creating a final picture by combining at least the first and the second captured frames.

* * * * *